United States Patent [19]

Germanton

[11] Patent Number: 4,832,142
[45] Date of Patent: May 23, 1989

[54] ELECTRONIC SCALE APPARATUS

[75] Inventor: Damon Germanton, Kennelon, N.J.

[73] Assignee: Measurement Specialties, Inc., Wayne, N.J.

[21] Appl. No.: 180,154

[22] Filed: Apr. 11, 1988

[51] Int. Cl.4 ............................................. G01G 21/08
[52] U.S. Cl. ................................. 177/256; 177/DIG. 9
[58] Field of Search .................. 177/211, 256, DIG. 9

[56] References Cited

U.S. PATENT DOCUMENTS

| | | | |
|---|---|---|---|
| 4,291,776 | 9/1981 | Kupper et al. | 177/229 |
| 4,456,085 | 6/1984 | Boyles | 177/256 |
| 4,462,475 | 7/1984 | Kushmuk | 177/256 X |
| 4,479,562 | 10/1984 | Mairot et al. | 177/256 |
| 4,712,628 | 12/1987 | Van den Brug | 177/229 X |

Primary Examiner—George H. Miller, Jr.
Attorney, Agent, or Firm—Arthur L. Plevy

[57] ABSTRACT

Electronic scale apparatus is provided wherein a force collecting lever system, disposed within a base, receives forces imposed upon a cover for that base from force communicating members disposed near peripheral locations on the cover. At each of the peripheral locations the cover is biasingly attached to the base to prevent instability of the cover or displacement thereof as a result of forces imposed on the cover. The forces imposed on the lever system by the force communicating members are collected, concentrated at a point and transmitted to a force collecting beam where the force is applied to a transducer beam having a transducer thereon where the precisely collected resultant force is measured.

26 Claims, 4 Drawing Sheets

ELECTRONIC SCALE APPARATUS

BACKGROUND OF THE INVENTION

This invention relates to electronic scale apparatus and more particularly to an electronic scale employing an analog strain gauge and a force collector lever system which is highly stable and acts to concentrate the force collected to a point.

While analog strain gauges are highly sensitive, their use as a force measuring transducer within electronic scales has frequently resulted in devices which were neither highly accurate, precise, nor stable. Thus, electronic scales employing analog strain gauges would typically manifest marked disparities in readings associated with a user improperly positioning or disposing his weight on the scale. Substantial disparities in readings would also occur as a result of a user's position on the device being off center. This resulted in a prevalent conception among the public at large that such electronic scale apparatus was inaccurate and often unreliable when, in fact, the source of such inaccuracies resided in the user's failure to appreciate the critical function which position played in the proper operation of the device.

For instance, in conventional electronic scale apparatus a lever system is utilized to collect the force imposed by a user on the cover of the scale. Such lever systems have not been heretofore designed to focus or concentrate the force collected at a sharply defined location such as a point where such concentrated force could be accurately measured by an analog transducer such as a strain gauge. This failure of the force collecting system to concentrate the force collected at a precise and sharply defined location would result in scale apparatus yielding widely varying results depending upon the position of the user on the device since the transducer would effectively be responding to force distributed over a measurement area. This distribution would vary substantially in accordance with the user's position on the scale.

In addition, while previously available electronic scale apparatus was configured with lever-type force collection systems intermediate a cover and base with the cover being anchored to the base to avoid removal thereof; the cover typically was not anchored in a manner to prevent small displacements thereof with respect to the base. Thus, if a user located himself off-center on the cover the fore/aft or left/right displacement of the force would cause a small rotation in the position of the cover to occur and prevent the force collecting lever system from accurately resolving the resulting force imposed by the user at the collection site. Accordingly, since the force collection schemes employed did not precisely concentrate the force collected at a well-defined site and the collection scheme was subject to error associated with the position of a user, conventional electronic scale apparatus frequently provided results which were inaccurate despite the use of analog strain transducers which, per se, are very sensitive and in themselves highly accurate.

Therefore, it is a principal object of the present invention to provide electronic scale apparatus wherein a lever system is employed to concentrate force at a point and the lever system is disposed to collect the force imposed by a user from a platform which is highly stable and relatively insensitive to a user's position. Various other objects and advantages of the present invention will become clear from the following detailed description of an exemplary embodiment thereof and the novel features will be particularly pointed out in conjunction with the claims appended hereto.

SUMMARY OF THE INVENTION

In accordance with the teachings of the present invention, electronic scale apparatus is provided wherein a force collecting lever system, disposed within a base, receives forces imposed upon a cover for that base from force communicating members disposed near peripheral locations on said cover, at each of said peripheral locations said cover is attached to said base with bias means to prevent instability of said cover or displacement thereof as a result of forces imposed on said cover; and forces imposed on said lever system by said force communicating members are collected, concentrated at a point and transmitted to a force collecting beam where the force is applied to a transducer beam having a transducer thereon where the precisely collected resultant force is measured.

BRIEF DESCRIPTION OF THE DRAWINGS

The invention will be more clearly understood by reference to the following detailed description of an exemplary embodiment thereof in conjunction with the accompanying drawings in which:

FIG. 6 is another partial cross-sectional view of the embodiment of this invention shown in FIG. 1 taken through the section lines 6—6 in FIG. 2 in the direction of the arrows to shown details of the knife edge; and FIG. 7 is another partial cross-section of the embodiment of this invention illustrated in FIG. 1 taken through the section lines 7—7 in FIG. 2 in the direction indicated by the arrows to show details by beam interconnection within the lever system.

DETAILED DESCRIPTION

Figure 1:
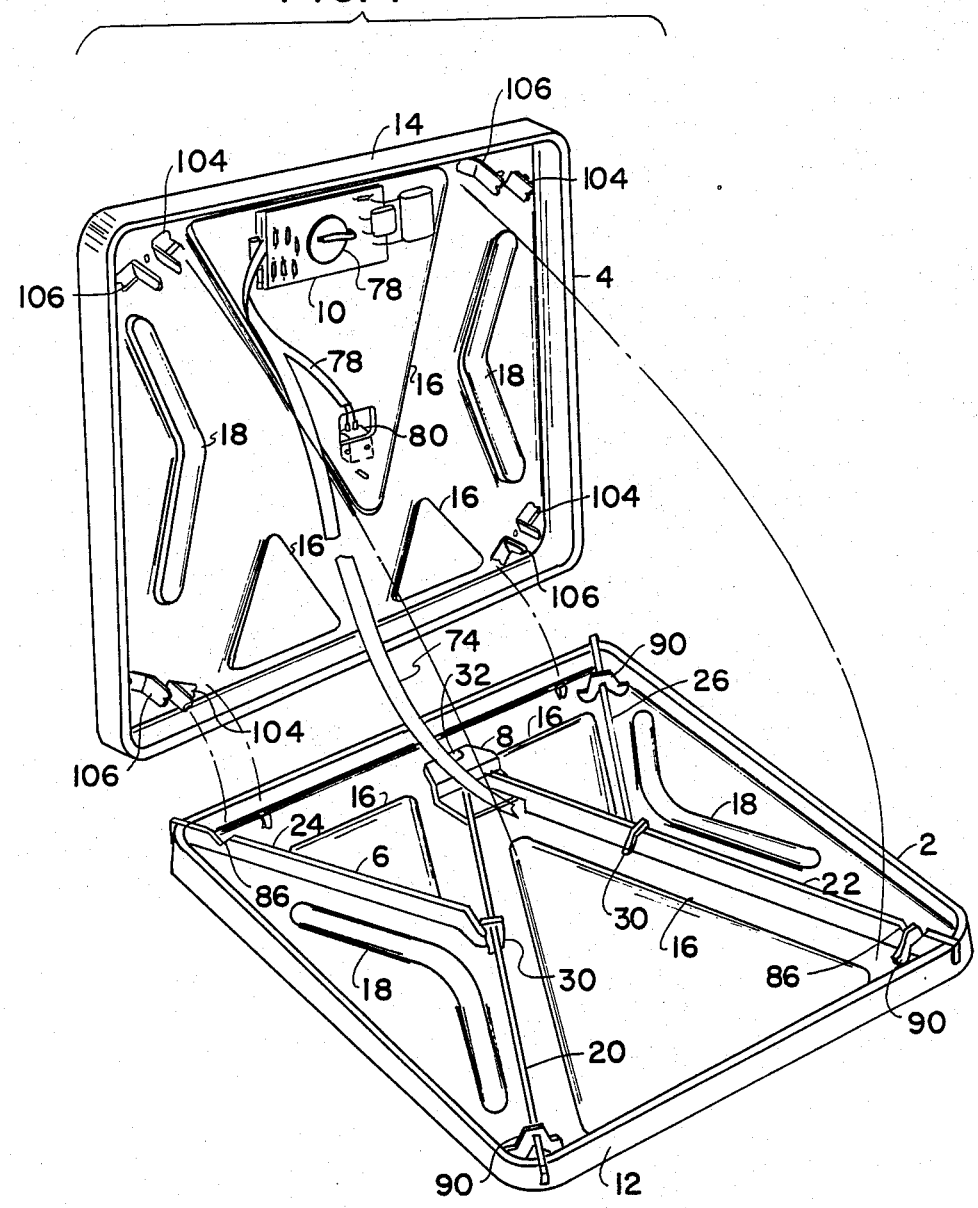
FIG. 1 is an exploded perspective view of an embodiment of an electronic scale in accordance with the teachings of the instant invention.

Referring now to the drawings, and more particularly to FIG. 1 thereof, there is shown a block diagram serving to schematically illustrate a preferred embodiment of the instant invention. More particularly, FIG. 1 is an exploded prospective view of an embodiment of electronic scale apparatus in accordance with the teachings of the present invention.

Figure 2:
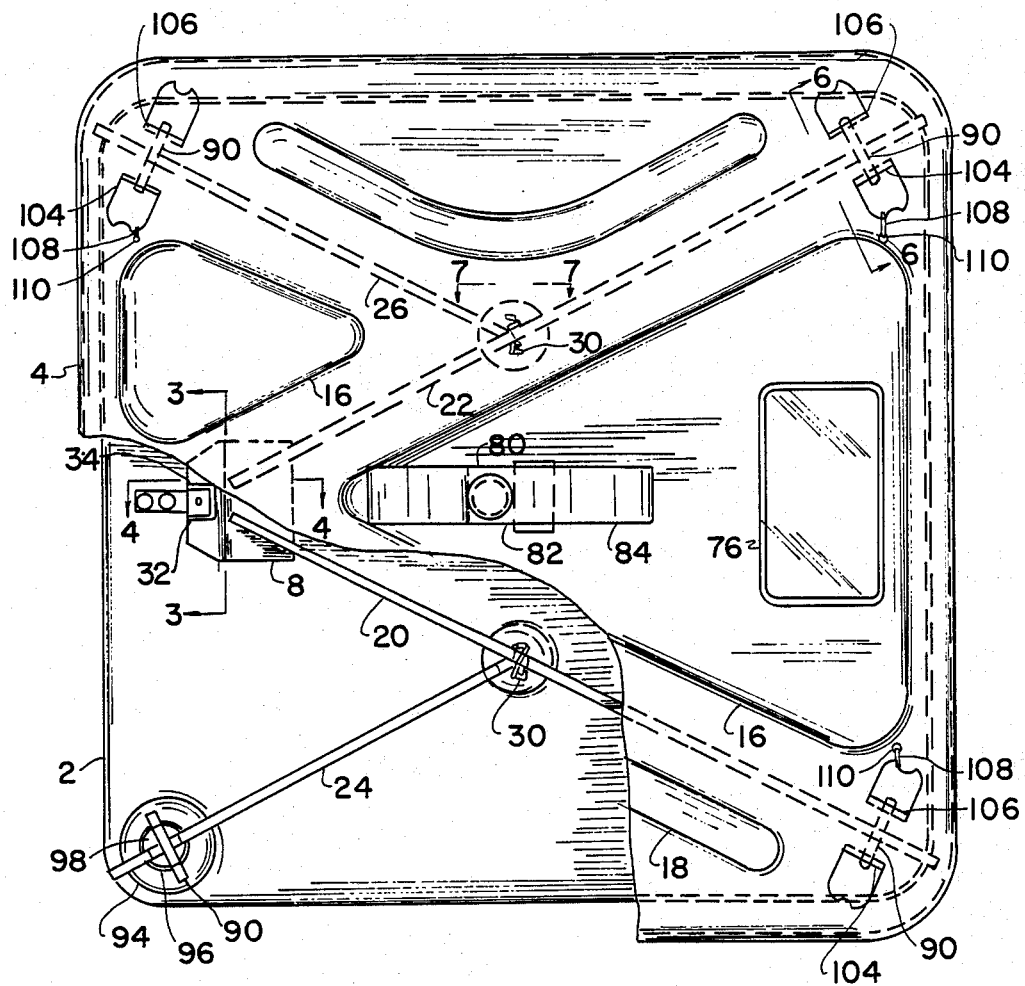
FIG. 2 is a top plan view of the embodiment of the invention shown in FIG. 1 with a portion of the cover broken out to facilitate discussion.

The embodiment of the electronic scale apparatus illustrated in FIG. 1 comprises a base 2, a cover 4, a force collecting lever system 6, a transducer plate 8 and an electronics display package 10 which will include a digital display. The base 2 and cover 4 may take the form of rigid metallic rectangular structures wherein the cover 4 is slightly enlarged, as best shown in FIG. 2 with respect to the base so that the same may be placed in an overlying, nested relationship therewith. Both the base 2 and cover 4 are provided with peripherally disposed side walls 12 and 14 as indicated in FIG. 1 and both the base 2 and cover 4 are preferably stamped with triangular and chevron shaped deformations 16 and 18 therein to add rigidity to the resulting structure in a manner well known to those of ordinary skill in the art. For the same reason, the gauge of metal employed should be sufficiently thick to insure that rigid, non-flexing structures are achieved.

The force collecting lever system 6, as best shown in FIGS. 1 and 2, may comprise first and second long beams 20 and 22 and first and second short beams 24 and 26. Each of the first and second long beams 20 and 22 is connected to the transducer plate 8 in the manner best illustrated in FIGS. 1 and 2, it being noted that the transducer plate may be riveted at a plurality of locations to a cutout portion of the long beams 20 and 22, as shown, to ensure structural rigidity. Each of the long beams 20 and 22 is provided with a notch at the opposed end thereof so that the same may be hooked over and be supported upon the sidewall 12 of the base 2 in the manner plainly indicated in FIGS. 1 and 2.

The same technique for mounting is also employed for the short beams in that each short beam 24 and 26 as plainly indicated in FIGS. 1 and 2 is notched and hung over the opposing corners of the base so as to be fixedly supported thereby. The opposed end of each of the short beams 24 and 26 is extended in the manner best illustrated in FIG. 7 to a notched finger-like protrusion 28 so as to accommodate connection to a beam hanger 30, also shown in FIGS. 1, 2 and 7. Each of the long beams 20 and 22 is correspondingly notched, as indicated in FIG. 7, to accommodate the beam hanger 30 to enable forces, as shall be seen below, collected by both the short and long beams interconnected by beam hanger 30 to be collected and provided to the transducer plate 8.

Each of the first and second long beams 20 and 22 thus acquire the force imposed thereon and by the short beam 24 or 26 connected thereto via the beam hangers 30. Both of the long beams 20 and 22 are riveted to the transducer plate 8 as aforesaid, it being noted that the transducer plate 8 is of rigid material so that the same may readily receive and transmit the forces provided thereto by the long beams 20 and 22. Thus, for instance, transducer plate 8 may be made of steel and stamped to provide the L-shaped cross-section generally indicated in FIG. 1 and plainly shown in FIG. 4.

Figure 3:
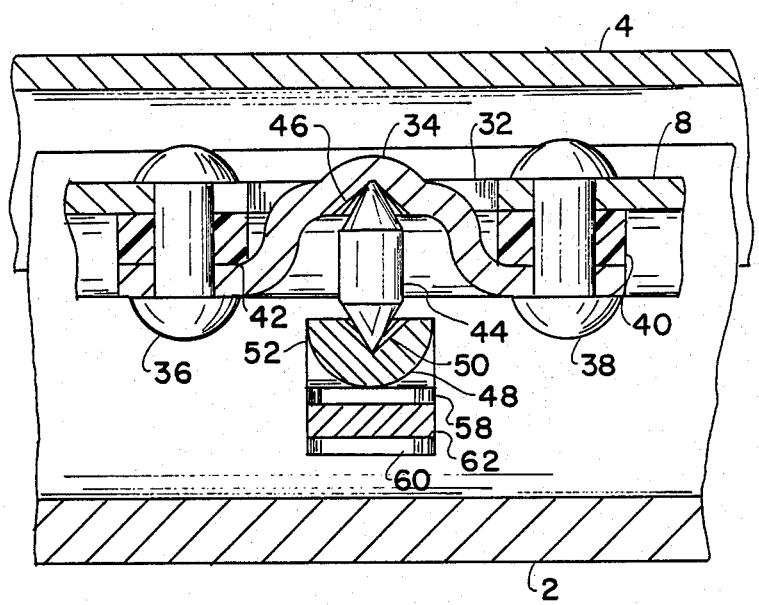
FIG. 3 is a partial cross-section of the embodiment of this invention shown in FIG. 1 taken through the section lines 3—3 in FIG. 2 in the direction indicated by the arrows.
Figure 4:
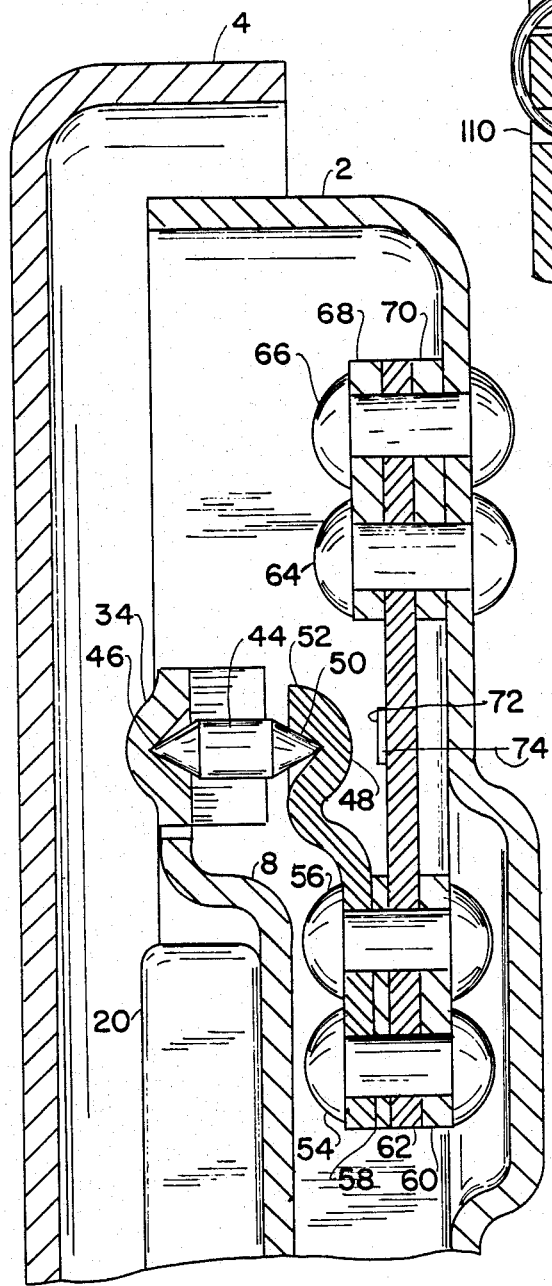
FIG. 4 is another partial cross-section of the embodiment of this invention shown in FIG. 1 taken through the section lines 4—4 in FIG. 2 in the direction indicated by the arrows.

The transducer plate 8 is provided with a cutout portion 32 as plainly illustrated in FIGS. 1-3. Across this cutout portion is mounted a strut receptacle 34 as best shown in FIGS. 2-4. The strut receptacle 34 is riveted as shown in FIG. 3 to the transducer plate 8 by a pair of rivets 36 and 38 which cooperate with spacers 40 and 42 to fixedly mount the strut receptacle 34 within the cutout portion 32 of the transducer plate. The strut receptacle 34 is configured, as best shown in FIGS. 3 and 4, to accept a strut 44 within a conical shaped indentation 46 therein so that the entire force collected at the transducer plate 8 is connected at a point of the conical indentation 46 and may be transmitted to the strut 44. The strut receptacle 34 is configured, as illustrated in FIGS. 3 and 4, to receive the force imparted to the transducer plate 8 and to concentrate the same at the location of the point of the conical portion 46 thereof.

The strut 44 may take the form, as indicated in FIGS. 3 and 4, of a steel strut having a generally cylindrical central portion with each end formed in the shape of a cone. Hard material for the strut 44 is preferred since, as will be readily appreciated by those of ordinary skill in the art, vertical transmission of the entire force collected by the transducer plate 8 is communicated between the points at the conical end portions thereof.

A force collecting beam 48, as best shown in FIGS. 3 and 4, is provided with a conical indentation 50 so as to receive the opposed end of the strut 44 and hence the force collected by transducer plate 8 and imparted to the strut 44. The force collecting beam 48 is preferably formed of steel material and, in fact, may comprise the same material as employed for the strut receptacle 34. The force collecting beam 48 is provided with a cup-like portion 52 within which the conical indentation 50 resides with the remaining portion of the force collecting beam 48 fixedly mounted by the rivets 54 and 56 as best shown in FIG. 4. Accordingly, cup-like portion 52 is cantilevered and receives the strut 44 in the manner plainly shown in FIG. 4.

The rivets 54 and 56 cooperate, as best shown in FIG. 4, with the force collecting beam 48, a pair of metallic spacers 58 and 60 and a transducer beam 62 to fixedly interconnect the force collecting beam 48 with the transducer beam 62 so that the entire force imparted to the force collecting beam 48 by the strut 44 is translated to the transducer beam 62. The transducer beam 62 is preferably made of steel material or the like so as to display the same characteristics as the force collecting beam 48. The transducer beam 62 is cantilevered within the assembly formed by the rivets 54 and 56, the force collecting beam 48, the spacers 58 and 60 by a fixed mounting to the base 2 by the rivets 64 and 66 and spacers 68 and 70. The spacers 68 and 70 may again take the form of metallic spacers such as were employed for the spacers 58 and 60.

The result is that the force imposed on the strut 44 and translated to the force collecting beam 48 is imposed as a bending strain on the transducer beam 62. An analog strain gauge, as generally indicated at 72, is centrally disposed on the transducer beam 62 to measure the resulting force imposed on the transducer beam 62. As indicated in FIG. 4, the base 2 may be deformed in the location associated with a cantilevered end of the transducer beam 62 and the rivets 54 and 56 to spacially accommodate the cantilevered assembly and insure that the bottom of the rivets 54 and 56 do not in any way interact with the base 2 even under bending moment.

The analog strain gauge 72, as generally indicated in FIG. 4, may take any of the conventional forms of this well-known class of device and produces an output of conductor 74 corresponding to the strain condition measured. For instance, a model LX14 analog strain gauge, as conventionally available from National Semiconductor Company may be employed. Those of ordinary skill in the art will appreciate that analog strain gauges of this type are highly sensitive and accurate in terms of measuring the strain imposed on the transducer beam 62. Further, while only a single conductor 74 is illustrated in FIG. 4, the same typically would take the form of a three wire conductor.

The output on conductor 74, as further indicated in FIG. 1, is applied to the electronics display package 10. The electronics display package 10 will typically comprise a digital display 76, as shown in FIG. 2, backed by a printed circuit board, as shown in FIG. 1. The printed circuit board includes a battery 78 and a plurality of components generally indicated on the electronics display package 10 appropriate to supply power to the elements of the circuit and otherwise power the digital display, as well as for translating the analog output of the strain gauge 72 into a numeric reading for the display 76. The entire electronics display package 10 may be entirely conventional and standard A to D techniques may be utilized therein.

Additionally, as indicated in FIG. 1, a second pair of wires 78 is connected to the electronics display package 10. This pair of wires, as shown in FIGS. 1 and 2, is connected to a switch 80 for selectively energizing the electronics display package 10 when a user positions himself on the electronic scale. The switch 80 may take the conventional form of a microswitch or other pressure activated switch whose activation plunger 82 underlies a leaf activator 84. The leaf activator 84 is spring biased to an open switch position and is normally present under a mat or rug pad present on the top of the scale. As well known to those of ordinary skill in the art, the leaf activator 84 and plunger 82 will be depressed to activate the switch 80 whenever a user positions his feet on the electronic scale. This closes a set of contacts to cause the battery 78 on the electronic display package 10 to energize the digital display 76 and the remaining components of the electronic scale. While the switch 80 is optional, those of ordinary skill in the art will appreciate that the same substantially extends the life of the battery within the electronic display package 10 and, hence, is highly useful.

The manner in which force applied by a user upon standing on the cover 4 is applied to the lever system formed by the first and second long beams 20 and 22 and the first and second short beams 24 and 26 may best be appreciated upon a consideration of FIGS. 1, 2, 5 and 6. More particularly, as best shown in FIG. 1, each of the long and short beams 20, 22, 24 and 26 is provided with a V-shaped notch 86 disposed, as illustrated in FIG. 1, near to the end portion of the short and long beam which hooks over the side 12 of the base 2. The V-shaped notch is thereby positioned in close proximity to each of the four corners of the base. Disposed within each V-shaped notch 86 is a knife edge 90 in the shape of an inverted U. The sharpened edge 92 of the knife edge is disposed to align the knife edge within the bottom of the V-shaped notch 86 and hence transmit the force imposed on the knife edge 90 to a precisely located corresponding position on each of the long 20 and 22 and short 24 and 26 beams. This position is proximate to each of the four corners of the base 2.

Underlying the location at each corner where the knife edge 90 is disposed within the V-shaped notch 86, the base 2 is provided with a circular depression 94 and an aperture 96, as best shown in FIGS. 2 and 6. Within this aperture is mounted a leg 98 which may be formed of nylon, plastic or the like and press fit within the aperture 96. In this manner, support is provided in the base 2 underlying each location where force is applied to a beam by the knife edge 90.

In the cover 4 at locations aligned with additional sharpen edges 100 and 102 of the knife edge 90 are punched a pair of knife edge mounts 104 and 106, as best seen in FIGS. 1 and 6, and whose shape may additionally be appreciated by inspection of the cutouts depicted in FIG. 2. Each knife edge mount is provided with an arc-shaped notch as best appreciated from the cutouts shown in FIG. 2 which engages the additional sharpen edges 100 and 102 of the knife edge 90 in the manner depicted in FIG. 6. Each of the sharpen edges 92, 100 and 102 of the knife edge 90 are aligned along a common axis and hence force imposed on the cover 4 by a user standing thereon is transmitted from the knife edge mounts 104 and 106 to the knife edge 90 and from the knife edge 90 to the V-shaped notch 86 of the beam on which the knife edge 90 is mounted along a single axis. In this manner force imposed by a user standing on the cover 4 is resolved and transmitted to the lever system formed by the long and short beams 20, 22, and 24 and 26 where the same is concentrated and applied to a point from which the same is measured.

Figure 5:
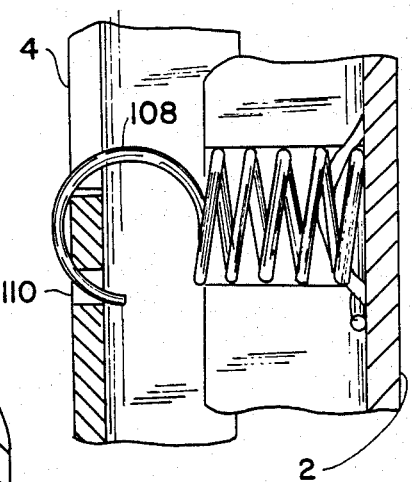
FIG. 5 is a partial section showing details of the spring mountings of the embodiment of this invention illustrated in FIG. 1.

To avoid a situation where off center positioning by a user might conceivably shift the cover 4 of the electronic scale in such a manner as to displace one or more of the knife edge mounts 104 and 106 from a portion of its associated knife edge 90 and hence prevent the force imposed by the user from being properly resolved, the cover 2 is biased against the base in the area of each of the knife edges by spring bias means 108 best shown in FIGS. 2 and 5. More particularly, those of ordinary skill in the art will readily appreciate that an extremely uneven weight distribution caused by a user's position could conceivably displace the cover to a slight degree causing one or more of the knife edge mounts 104 and 106 to become ajar with respect to the knife edge sharpened edges 100 and 102 associated therewith. When this occurs the entire force imposed on the cover 4 will not be properly resolved at the four corners of the device where a collection by the beam system takes place.

To avoid this result spring bias means 108, as shown in FIG. 5 and FIG. 2, is extended through the cutout for the interior facing knife edge mount and hooked through an aperture 110 provided therefor. On the base, the spring bias means 108 is hooked through a loop 112, as shown in FIG. 5, provided in the base therefor. The spring bias means 108 are designed to exhibit sufficient tension on the cover 4 so that even extreme off-center positioning by a user will not cause the cover 4, and more particularly the knife edge mounts 104 and 106 at each corner, to displace from the knife edge 90. The electronics display package 10 and/or the analog strain gauge 72 are set so that the force exhibited by each of the spring bias means 108 establish a threshold for the device so that the same will cause the digital display 76 to read a zero value when no additional force is exerted on the cover 4.

Accordingly, it will be appreciated that the electronic scale, according to the instant invention, employs a beam system which is rendered independent of a user's position to collect the force imposed by a user on the electronic scale. The force thus collected uniformly from peripheral portions of the device is then concentrated at a point where it is employed by a beam cantilever system to deform a transducer beam. An analog strain gauge or the like mounted on the transducer beam is then employed to accurately measure the force which has been concentrated at a point.

Although the instant invention has been described in connection with a highly specific exemplary embodiment thereof, it will be understood that many modifications and variations thereof will be readily apparent to those of ordinary skill in the art. Therefore, it is manifestly intended that this invention be only limited by the claims and the equivalents thereof.

What is claimed is:

1. Electronic scale apparatus comprising:
   a base;
   cover means for said base, said cover means for receiving force imposed thereon by a user;
   a force collecting lever system disposed within said base, said force collecting lever system including a plurality of beams and transducer plate means, said plurality of beams being arranged to receive and collect force imposed on said cover means and apply force collected to said transducer plate means, said transducer plate means for resolving force applied thereto at a point, each of said beams having a notch disposed therein substantially at one end thereof and each of said beams being supported upon a sidewall of said base by disposing said notch thereon;
   transducer means for measuring force resolved at a point by said transducer plate means;
   means for communicating force received by said cover means to a predetermined position on each of said plurality of beams, which communicating means comprises a plurality of pairs of knife edge mounts affixed to said cover means; and
   said base further comprises support means affixed to said base substantially underlying each of said predetermined positions where force is communicated from said cover means to said plurality of beams.

2. The electronic scale apparatus according to claim 1 additionally comprising spring bias means affixed to said cover means and said base in the area of said predetermined positions for retaining said cover means in a stable position on said base in the presence of off-center force imposed on said cover means.

3. The electronic scale apparatus according to claim 2 wherein said base and cover means are rectangular in shape.

4. The electronic scale apparatus according to claim 1 wherein said means for communicating force further includes a plurality of knife edge means which are responsive to said plurality of pairs of knife edge mounts affixed to said cover means, each of which plurality of knife edge means are disposed intermediate each of said plurality of pairs of knife edge mounts and each of said plurality of beams and located at said predetermined positions which are toward peripheral portions of said cover means.

5. The electronic scale apparatus according to claim 1 wherein said plurality of beams comprise first and second pairs of beams, each of plurality of beams extending within said base to a location underlying a peripheral portion of said cover means and each of said first and second pairs of beams including one beam extending between said peripheral portion and said transducer plate means and another beam extending between said peripheral portion and an intermediate position of said one beam.

6. The electronic scale apparatus according to claim 5 additionally comprising beam hanger means for interconnecting said intermediate position of said one beam with said another beam and conveying force collected by said another beam to said one beam.

7. The electronic scale apparatus according to claim 1 additionally comprising a cantilever force collecting beam disposed beneath said transducer plate means, a transducer beam connected to said cantilever force collecting beam in a cantilvered assembly, and strut means for communicating force resolved at a point by said transducer plate means to said cantilever force collecting beam, said transducer means being mounted on said transducer beam.

8. The electronic scale apparatus according to claim 7 wherein said cantilever force collecting beam includes a conical indentation and said strut means has opposed conically shaped end portions for conveying force resolved at a point by said transducer plate means to said force collecting beam.

9. The electronic scale apparatus according to claim 8 wherein said means for communicating force further includes a plurality of knife edge means which are responsive to said plurality of pairs of knife edge mounts affixed to said cover means, each of which plurality of knife edge means are disposed intermediate each of said plurality of pairs of knife edge mounts and each of said plurality of beams and located at said predetermined positions which are toward peripheral portions of said cover means.

10. The electronic scale apparatus according to claim 9 wherein said plurality of beams comprise first and second pairs of beams, each of plurality of beams extending within said base to a location underlying a peripheral portion of said cover means and each of said first and second pairs of beams including one beam extending between said peripheral portion and said transducer plate means and another beam extending between said peripheral portion and an intermediate position of said one beam.

11. The electronic scale apparatus according to claim 10 additionally comprising beam hanger means for interconnecting said intermediate position of said one beam with said another beam and conveying force collected by said another beam to said one beam.

12. The electronic scale apparatus according to claim 1 wherein said transducer plate means includes a conical indentation for resolving forces applied thereto at a point.

13. The electronic scale apparatus according to claim 12 additionally comprising spring bias means affixed to said cover means and said base in the area of said predetermined positions for retaining said cover means in a stable position on said base in the presence of off-center force imposed on said cover means.

14. The electronic scale apparatus according to claim 13 wherein said base and cover means are rectangular in shape.

15. The electronic scale apparatus according to claim 14 additionally comprising a cantilever force collecting beam disposed beneath said transducer plate means, a transducer beam connected to said cantilever force collecting beam in a cantilevered assembly, and strut means for communicating force resolved at a point by said transducer plate means to said cantilever force collecting beam, said transducer beams being mounted on said transducer beam.

16. Electronic scale apparatus comprising:
   a base;
   cover means for said base, said cover means for receiving force imposed thereon by a user;
   a force collecting lever system disposed within said base, said force collecting lever system including a plurality of beams and transducer plate means, said plurality of beams being arranged to receive and collect force imposed on said cover means and apply force collected to said transducer plate means, said transducer plate means for resolving force applied thereto at a precisely defined location, each of said beams having a notch disposed therein substantially at one end thereof and each of said beams being supported upon a sidewall of said base by disposing said notch thereon;

transducer means for measuring force resolved at said precisely defined location by said transducer plate means;

means for communicating force received by said cover means to a predetermined position on each of said plurality of beams, which communicating means comprises a plurality of pairs of knife edge mounts affixed to said cover means;

spring bias means affixed to said cover means and said base in the area of said predetermined positions for retaining said cover means in a stable position on said base in the presence of off-center force imposed on said cover means; and said base further comprises support means affixed to said base substantially underlying each of said predetermined positions where force is communicated from said cover means to each of said plurality of beams.

17. The electronic scale apparatus according to claim 16 wherein said transducer plate means acts to resolve force applied thereto at a point.

18. The electronic scale apparatus according to claim 17 additionally comprising a cantilever force collecting beam disposed beneath said transducer plate means, a transducer beam connected to said cantilever force collecting beam in a cantilevered assembly, and strut means for communicating force resolved at a point by said transducer plate means to said cantilever force collecting beam, said transducer means being mounted on said transducer beam.

19. The electronic scale apparatus according to claim 16 wherein said means for communicating force further includes a plurality of knife edge means which are responsive to said plurality of pairs of knife edge mounts affixed to said cover means, each of which plurality of knife edge means are disposed intermediate each of said plurality of pairs of knife edge mounts and each of said plurality of beams and located at said predetermined positions which are toward peripheral portions of said cover means.

20. The electronic scale apparatus according to claim 16 wherein said plurality of beams comprise first and second pairs of beams, each of plurality of beams extending within said base to a location underlying a peripheral portion of said cover means and each of said first and second pairs of beams including one beam extending between said peripheral portion and said transducer plate means and another beam extending between said peripheral portion and an intermediate position of said one beam.

21. The electronic scale apparatus according to claim 20 additionally comprising beam hanger means for interconnecting said intermediate position of said one beam with said another beam and conveying force collected by said another beam to said one beam.

22. The electronic scale apparatus according to claim 16 wherein said base and cover means are rectangular in shape.

23. The electronic scale apparatus according to claim 16 wherein said transducer plate means includes a conical indentation for resolving forces applied thereto at a point.

24. The electronic scale apparatus according to claim 23 additionally comprising a cantilever force collecting beam disposed above said transducer plate means, a transducer beam connected to said cantilever force collecting beam in a cantilever assembly, and strut means for communicating force resolved at a point by said transducer plate means to said cantilever force collecting beam, said transducer means being mounted on said transducer beam.

25. The electronic scale apparatus according to claim 24 wherein said cantilever force collecting beam includes a conical indentation and said strut means has opposed conically shaped end portions for conveying force resolved at a point by said transducer plate means to said force collecting beam.

26. The electronic scale apparatus according to claim 25 wherein said base and cover means are rectangular in shape.

* * * * *